United States Patent [19]

Nguyen et al.

[11] 4,447,091

[45] May 8, 1984

[54] CONVERTIBLE WIRE WHEEL HUB COVER

[75] Inventors: Liem Nguyen, Garden Grove; William J. Segal, Van Nuys; Kent Friend, Santa Ana, all of Calif.

[73] Assignee: Orion Industries, Inc., Compton, Calif.

[21] Appl. No.: 237,251

[22] Filed: Feb. 23, 1981

[51] Int. Cl.$^3$ .............................................. B60B 7/04
[52] U.S. Cl. .......................... 301/37 AT; 301/37 SS; 301/37 SC
[58] Field of Search .............. 301/37 R, 37 AT, 37 P, 301/37 S, 37 SS, 37 SC

[56] References Cited
U.S. PATENT DOCUMENTS

| | | | |
|---|---|---|---|
| 2,594,407 | 4/1952 | Earnest | 301/37 AT |
| 2,693,394 | 11/1954 | Gamet et al. | 301/37 SS |
| 2,722,822 | 11/1955 | Thomas | 301/37 AT |
| 3,967,855 | 7/1976 | Johnson | 301/37 R |
| 3,989,306 | 11/1976 | Buerger | 301/37 SS X |
| 4,083,606 | 4/1978 | Scrubbs | 301/37 AT |
| 4,116,490 | 9/1978 | Huff et al. | 301/37 SS X |
| 4,243,270 | 1/1981 | Fenton et al. | 301/37 SC X |
| 4,274,679 | 6/1981 | Brinson et al. | 301/37 AT |
| 4,346,940 | 8/1982 | Tatar | 301/37 AT |

FOREIGN PATENT DOCUMENTS

| | | | |
|---|---|---|---|
| 1004084 | 11/1951 | France | 301/37 SC |
| 444095 | 1/1949 | Italy | 301/37 SC |

Primary Examiner—Charles A. Marmon
Attorney, Agent, or Firm—Fulwider, Patton, Rieber, Lee & Utecht

[57] ABSTRACT

A conversion kit for an automotive wheel cover, which has a central opening defined therein, is provided by securing a hub spacer to a vehicle wheel against a bolt-on flange formed as part of the vehicle wheel. The hub spacer is secured by lug bolts or nuts. The hub spacer forms a guide which extends from the vehicle wheel toward the central opening of the wheel cover. A fastener, which is longitudinally constrained with respect to the hub spacer, is included within the guide and is laterally movable to allow the fastener to be aligned within the central opening of the wheel cover. A replacement hub cap is mounted in place of the conventional non-locking hub cap. An annular concentric recess is formed in the replacement hub cap and is disposed in a direction away from the automotive wheel. The annular recess forms a narrow bearing shoulder and a small diameter axial bore through which the fastener is disposed. A lockable fastening bolt is seated in the recess of the replacement hub cap against the narrow shoulder and engages the fastener in the guide. The lockable fastening bolt is characterized by having a highly contoured interfaced surfce. A removable locking key is provided which snugly seats in the recess and engages the contoured interface surface of the lockable fastening bolt. The key is used for engaging and disengaging the lockable fastening bolt from the fastener in the guide to thereby unlock and lock the replacement hub cap. A cap cover is mounted in the replacement hub cap to conceal the recess and the lockable fastening bolt.

6 Claims, 13 Drawing Figures

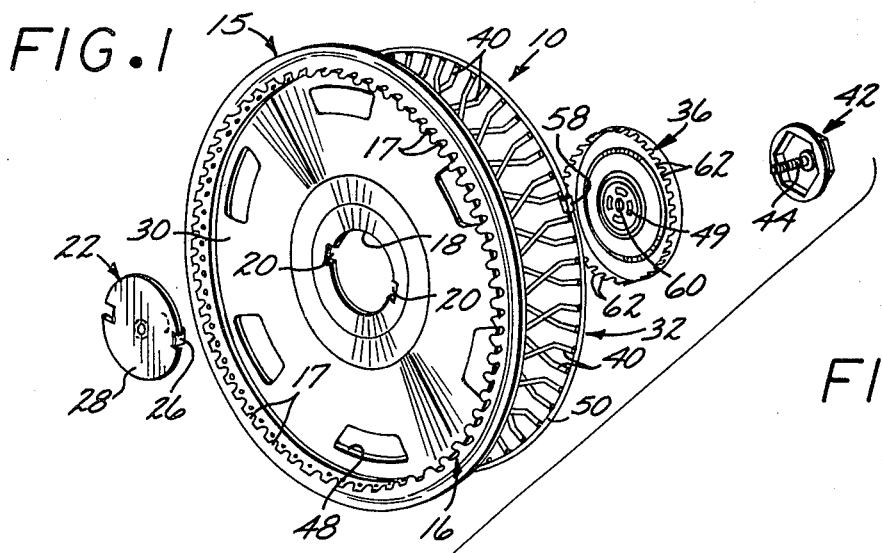
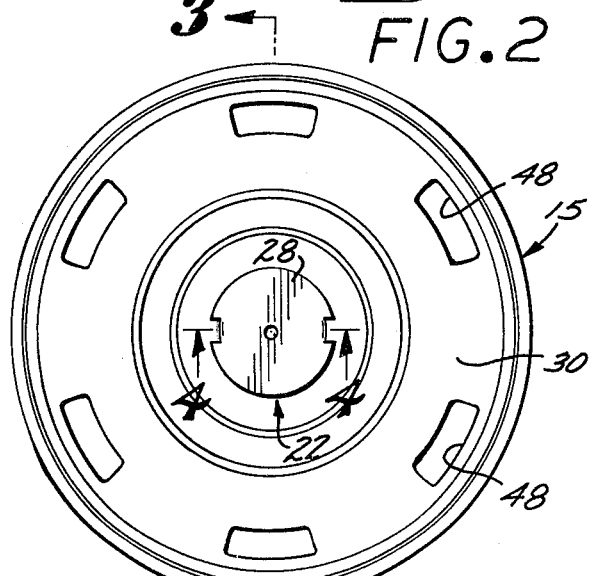
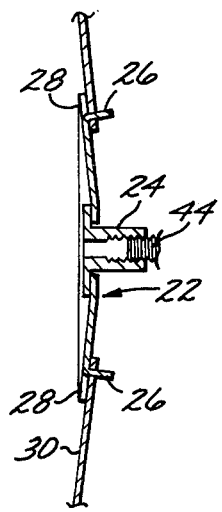
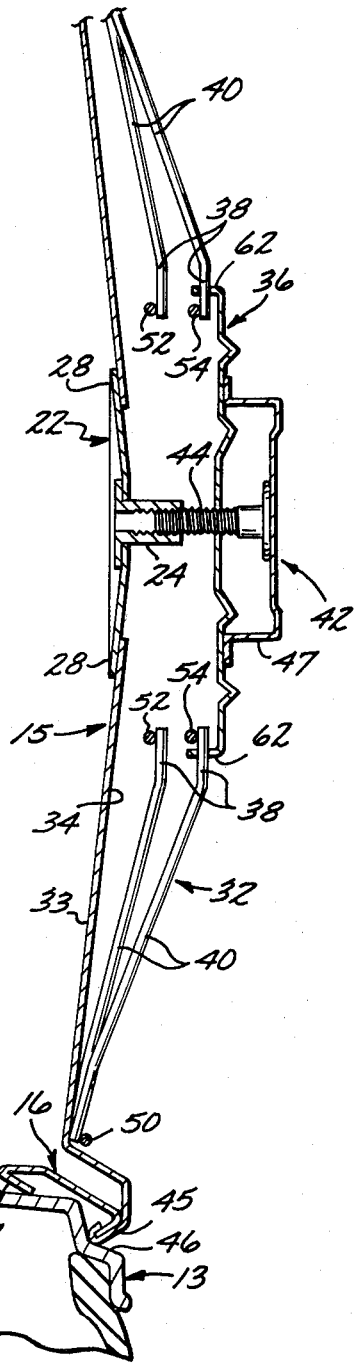
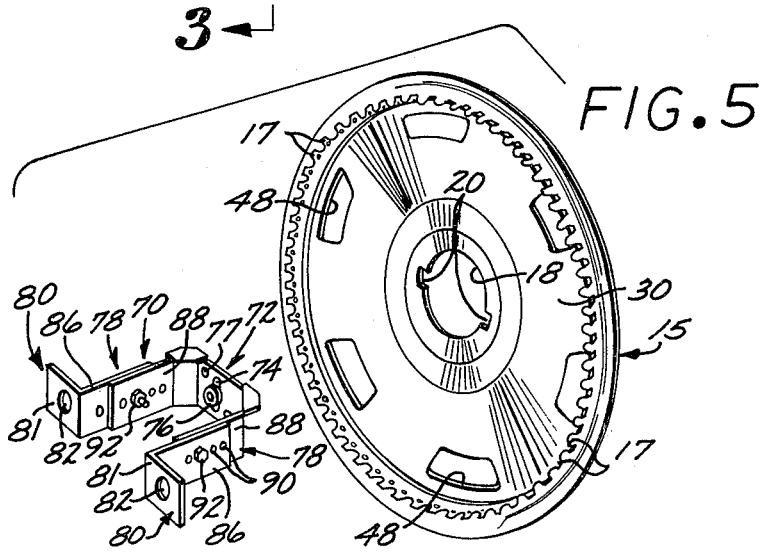

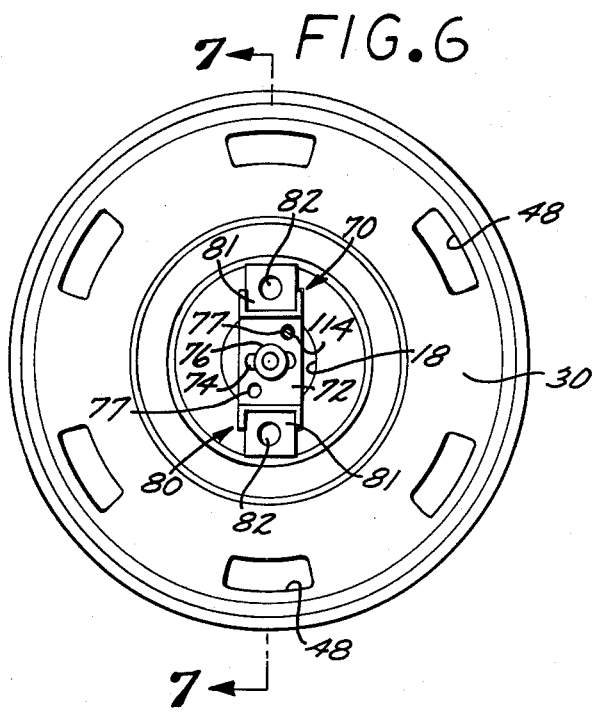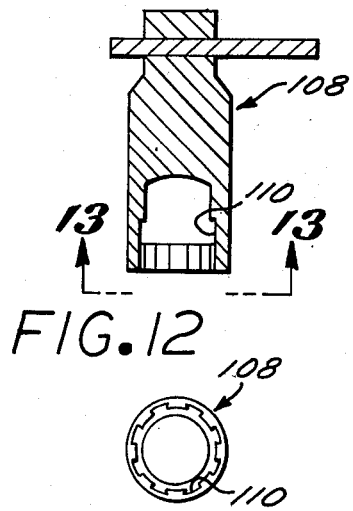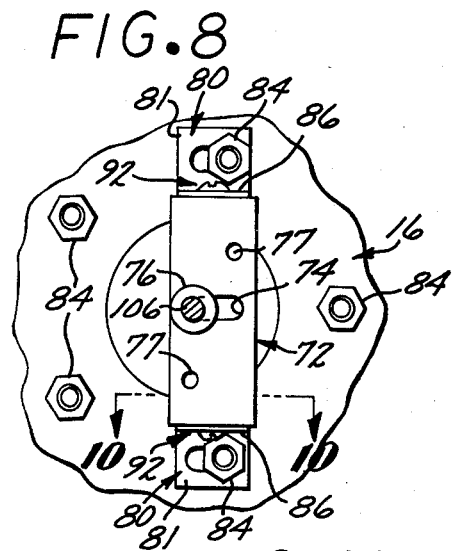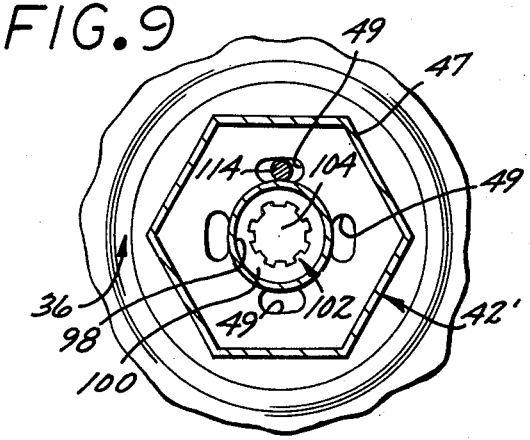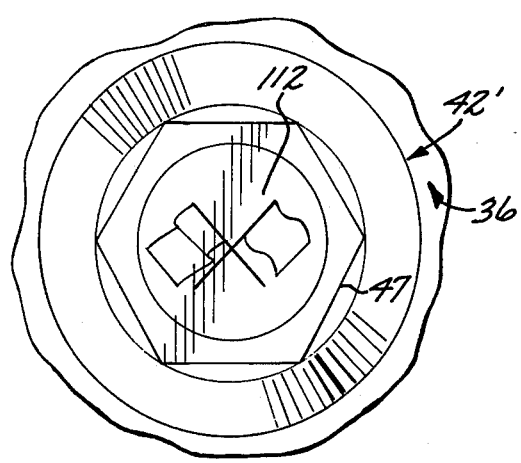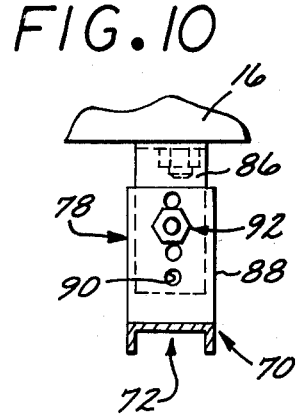

CONVERTIBLE WIRE WHEEL HUB COVER

BACKGROUND OF THE INVENTION

1. Field of the Invention

The present invention relates to automotive wheel covers.

2. Description of the Prior Art

In recent years decorative automotive vehicle wheel covers have become quite fashionable and commercially popular. Conventional automotive vehicle hubcaps are formed of stamped sheet metal having inner and outer surfaces and have a deformed edge ring crimped therein. The deformed edge ring extends inwardly to grip a vehicle tire rim. One popular style of decorative automotive wheel cover provides an annular wire basket with interconnected wire spokes thereon. The wire basket seats against the outer surface of the stamped sheet metal hub cover and is held in place by a central retention ring that has a perimeter configured to receive the radially inner ends of the wire spokes and an overlying hubcap which bears against the retention ring and is threadably engaged with a stud, nipple, or tapped bore located at the center of the hub cover. The resulting structure visually simulates a more expensive spoked automobile wheel in which a tire is carried on a wheel having a tire rim that is secured to a central axial wheel hub by means of a multiplicity of spokes. Decorative wheel covers of this type simulating such an appearance are quite attractive, but their cost is only a fraction of the cost of an actual spoked automobile wheel.

Because of their attractiveness and value, actual spoked automotive vehicle wheels are freequently stolen, oftentimes right off of the vehicle. Accordingly, automobile wheel cover locks have been used to prevent such theft. Although wheel covers with wire spokes thereon simulated to resemble the construction of an actual spoked wheel are considerably cheaper than true spoked wheels, the authentic appearance and the attractiveness of such wheel covers has likewise resulted in an alarming rate of theft. While hubcap locks have been developed which hinder the removal of wheel covers as well as entire vehicle wheels, a wheel cover having a hub cover that is convertible to accommodate a lock, has not heretofore been available.

For some time, certain types of wheel covers have been constructed to accommodate wheel cover locks, but in conventional wheel covers such locks are a necessary adjunct to the wheel cover and such wheel covers cannot be used without a wheel cover lock especially designed for the wheel cover involved. Conversely, those conventional wheel covers which are initially manufactured without a locking mechanism cannot be converted to adapt to a locking system. Rather, if an individual purchases wheel covers not adapted for use with wheel cover locks, but later determines that wheel cover locks are financially warranted, the only recourse has been to purchase an entire new set of automotive vehicle wheel covers especially designed for use with wheel cover locks.

Various problems also exist in using vehicle wheel cover locks currently available. In the past, adjustments for the hub spacers for vehicle wheel cover locks have only been provided by utilizing a plurality of set, spaced holes in the pads of the feet of the hub spacers to bring a tapped bore in such a hub spacer into registration with the axial center of the wheel. Incremental adjustment of this type has been imprecise and mounting of a locking hubcap has typically been off center. This has proven particularly disadvantageous where a configured retention ring is utilized to fit over the inwardly extending ends of the wire spokes in the wire basket, since proper seating of the retention ring requires precise axial placement.

The prior wheel cover locking mechanisms have also failed to provide for differences in distances which vehicle wheel hub covers extend out from the vehicle wheel. While some hub covers are relatively shallow and the centers thereof reside fairly close to the wheel, other hub covers extend much further out from the center of the wheel.

SUMMARY OF THE INVENTION

According to the present invention, an automotive vehicle wheel cover is provided which is convertible for use either with or without a wheel cover lock. The vehicle wheel cover according to the invention is provided with a hub cover which has a central opening therein coaxial with the wheel axle. A separate plate is removably mounted in the central hub cover opening and includes peripheral flanges or a border that bears against the inside surface of the hub cover when the plate is positioned in the hub cover opening. A threaded nipple, stud, tapped bore or other fastener is defined in the closure plate so that an overlying hubcap removably mounted externally of the hub cover can be threadably engaged therewith to entrap an annular spoked wire basket and basket retention ring therebetween. Alternatively, however, the wheel cover can be converted to a locking wheel cover.

When the wheel cover of the invention is to be utilized as a locking wheel cover, the removable plate is removed from the opening at the center of the hub cover. A hub spacer, typically formed in a U-shape with opposing feet, upright legs and a transverse bridge, is mounted on the bolt-on flange of the wheel itself, usually by lug bolts or lug nuts. A guide is defined in the bridge and a fastener is secured therein and is longitudinaly constrained but laterally movable within the guide. The hub spacer fastener may include a tapped bore or an outwardly extending stud or nipple at the hub cover opening. A locking replacement hubcap, like the original hubcap, seats against the retention ring which entraps the spoked wire basket. The locking hubcap, however, has a centrally defined exteriorally facing axial recess which has a narrow annular bearing shoulder and smaller diameter axial bore. The axial recess receives the head of the locking bolt, or nut, in a recessed fashion. The head of the locking bolt or the locking nut has a specially contoured interface surface, which may be the outer perimeter, so that it seats snugly in the axial recess, but is still engabable by a special key. The key has a tubular body that fits snugly into the axial recess in engagement with the contoured interface surface of the locking nut or head of the locking bolt. The specially shaped key is used to tighten and release the locking hubcap relative to the mounting bracket. A decorative masking cap is normally positioned on the locking hubcap over the axial recess so as to conceal the locking bolt and recess from view.

By utilizing the wheel cover of the invention, an individual can purchase a decorative wheel cover without entailing the expense of a wheel cover lock, but thereafter readily adapt the wheel cover for use with a locking system merely by removing the plate from the opening at the center of the hub cover, and by replacing the original hubcap with a locking mechanism. The locking mechanism includes a hub spacer, a locking replacement hubcap, a locking bolt or nut, and a cap. The locking system may be supplied as a conversion kit. The concealed lock in the locking hubcap employed in the conversion kit helps prevent wheel cover theft.

The wheel cover of the invention may be sold with or without the locking system conversion kit. The wheel cover is always convertible at any time to a locking system with the purchase of a locking kit. Accordingly, the owner of an automotive accessory supply facility is able to reduce his inventory requirement by obviating the need for separate locking and non-locking wheel cover systems. Rather, wheel covers according to the invention may be ordered and stocked to serve the needs both of customers who want locking wheel covers, and also those customers who do not wish to entail the expense of a locking system. The locking system conversion kit can then be sold with the wheel cover of the invention, or separately, to customers wishing to insure against theft of their wheel covers.

The wire basket of the wheel cover system of the invention is removable whether the wheel cover is employed as a locking or non-locking system. By removing the wire basket the hub cover and basket may both be easily and safely cleaned.

The wheel cover according to the invention employs a retention ring separate from the hubcap. The retention ring is configured with inwardly directed teeth which fit between and bracket the spokes of the wire basket. This insures concentric fit of the retention ring and hubcap against the wire basket and also insures a maximum grip on the wire basket.

The wire basket is carefully engineered and designed to duplicate a wire wheel, right down to the simulation of adjusting nuts for the spokes. In the preferred embodiment, both the wire basket and the hub cover are tripleplated with chrome for longer lasting life.

The hub spacer of the invention is constructed to define a guide within which a fastener is retained. The guide may take the form of an elongated slot in the hub spacer and a nut may be swaged onto the hub spacer in the slot, so that the nut is reciprocally movable along the length of the slot, but cannot be rotated therewithin and is longitudinally constrained so that it cannot move in a direction parallel to the wheel axis. With the adjustability afforded by the slidable movement of the locking nut, the fastener of the hub spacer can be precisely aligned with the vehicle wheel axis. To the extent that shifting the nut is necessary to achieve this alignment, the locking nut is slidably movable within the slot.

A further feature of the preferred embodiment of the invention is that locator aperatures are defined in both the retaining ring and the hub spacer, and a locator pin, laterally offset from the axial center of the locking hubcap, extends inwardly through the locator aperatures in the retention ring and the hub spacer to immobilize the retention ring, the wire basket and the hub cover against rotation relative to the bolt-on flange of the vehicle wheel.

The invention may be described with greater clarity and particularity by reference to the accompanying drawings.

DESCRIPTION OF THE DRAWINGS

FIG. 1 is an exploded perspective view of a wheel cover according to the invention without a locking mechanism.

FIG. 2 is an inside elevational view of the hub cover of FIG. 1.

FIG. 3 is an enlarged sectional elevational detail taken along the lines 3—3 of FIG. 2.

FIG. 4 is an enlarged sectional detail taken along the lines 4—4 of FIG. 2.

FIG. 5 is an exploded perspective view showing a hub spacer and hub cover according to the invention for use with a locking mechanism.

FIG. 6 is an elevational view from inside the hub cover of FIG. 5.

FIG. 8 is a detailed elevational view taken along the lines 8—8 of FIG. 7.

FIG. 9 is a sectional elevational detail taken along the lines 9—9 of FIG. 7.

FIG. 10 is a sectional detail taken along the lines 10—10 of FIG. 8.

FIG. 11 is a detail view taken along the lines 11—11 of FIG. 7.

FIG. 12 is a sectional elevational view of a key for a locking mechanism of the invention.

FIG. 13 is an end view taken along the lines 13—13 of FIG. 12.

DESCRIPTION OF THE EMBODIMENT

Figure 7:
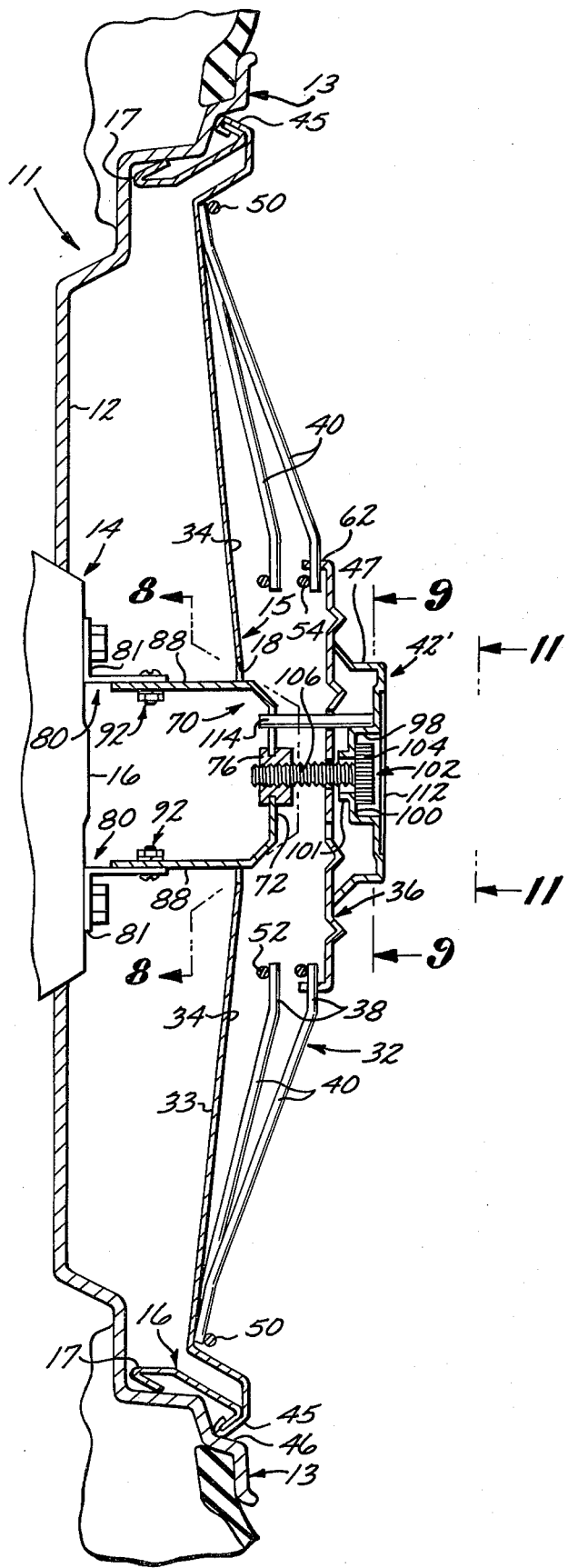
FIG. 7 is a sectional elevational view taken along the lines 7—7 of FIG. 6.

FIG. 1 illustrates a wheel cover 10 for use in combination with an automotive vehicle wheel 11, a portion of which is depicted in FIG. 7. The vehicle wheel 11 has a radially extending bolt-on flange 12 formed at its radially outer portion with a conventional multi-flange drop center tire rim 13. At the center of the bolt-on flange 12 there is a raised hub 14.

With reference to FIG. 1, the wheel cover 10 of the invention includes a hub cover 15 formed of stamped sheet metal, the perimeter of which is crimped around a deformed annular sheet metal ring 16 which provides radially peripherally located, inwardly directed fingers 17 for gripping the tire rim 13. The hub cover 15 has an interior surface 30 facing the vehicle wheel 11 and an opposite exterior surface 34 facing outwardly therefrom. The hub cover 15 has a central axial, circular opening 18 defined therein with diametrically opposed squared out notches 20 on either side. A closure plate 22 in the form of a disc has a central outwardly directed threaded nipple 24 welded thereto to serve as a fastener, as depicted in FIGS. 3 and 4. The plate 22 is removably mounted in the central opening 18 of the hub cover 15 so that its border or periphery 28 bears against the interior surface 30 of the hub cover 15 adjacent the opening 18. An annular wire basket 32 with interconnected spokes 40 is seated upon the exterior surface 34 of the hub cover 15. A retention ring 36 is located exteriorally on the wire basket 32 to cover the center of the basket 32 and is configured to seat upon the spokes 40. A hubcap 42 is mounted externally of the retention ring 36 at the center thereof and has a fastener in the form of a stud 44 that is engaged with the nipple 24 of the plate 22 to secure the hubcap 42 and the wire basket 32 to the hub cover 15.

The hub cover 15 is a stamped, annular cold-rolled steel structure having a peripheral crimped bead 45 which seats in an annular channel 46 in the rim 13 of the wheel 11. The hub cover 15 has, in addition to the central axial opening 18, several radially spaced generally trapezoidal shaped openings 48 stamped from the metal structure, visible in FIGS. 1, 2 and 6. The inwardly directed fingers 17 for gripping the tire rim 13 of the wheel 11 are defined on a second annular sheet metal ring 16, which is held in cantilevered fashion by the turned over edge of the bead 45 of the larger metal stamped hub cover 15.

The disc-shaped plate 22 serves as a closure for the aperture 18 in the wheel hub cover 15 and is depicted in detail in FIGS. 2, 3 and 4. The plate 22 is also a metal stamping and is defined slightly convex outwardly. The nipple 24 has a flanged base and is secured to the plate 22 at an aperture in the center thereof by means of a weld or solder. The outer periphery or border 28 of the plate 22 bears against the interior surface 30 of the hub cover 15 at the edges of the opening 18, as depicted in FIGS. 3 and 4. The plate 22 is stamped with a pair of diametrically opposite, radial flanges 26 that are turned outwardly. The extremities of the flanges 26 are canted slightly toward the axial center of the plate 22. The flanges 26 pass through the radial notches 20 in the opening 18 and return to their original configuration, so as to releasably engage the plate 22 in position in the opening 18, as depicted in FIGS. 2-4.

The spoked wire basket 32 has a chrome finish and is constructed of spokes 40 and a large diameter outer wire hoop 50 and two smaller diameter inner wire hoops 52 and 54, illustrated in FIGS. 3 and 7. The spokes 40 are interconnected, as they are welded to the hoops 50, 52 and 54. The spokes 40 extend inwardly toward the axial center of the basket 32 from the outer hoop 50 to their inner extremities 38. The inner extremities of one series of spokes 40 extend in a common direction of angular orientation relative to the inner hoop 54, while the other series of spokes 40 extends in an opposite direction of angular orientation relative to the hoop 52. The hoop 52 is carried axially inwardly relative to the hoop 54 by the spokes 40 so as to provide an outer series and an inner series of spokes 40. Plastic clips 58, visible in FIG. 1, are mounted on the outer hoop 50 to aid in positioning the spoked wire basket 32 against the exterior surface 34 of the hub cover 15. The plastic clips 58 also reduce the extent to which the exterior surface 34 of the hub cover 15 is scratched by the hoop 50 and spokes 40.

The retention ring 36 is depicted in FIGS. 1 and 3 and has a central axial opening 60. The perimeter of the retention ring 36 is configured to seat upon the spokes 40 and has inwardly directed teeth 62 which fit between and bracket the spokes 40. The retention ring 36 is also a stamped, sheet metal structure, preferably having a chrome finish. The teeth 62 of the retention ring 36 fit about the inner extremities 38 of the spokes 40 and the threaded stud 44 of the hubcap 42 passes through the central aperture 60 in the retention ring 36. The retention ring 36 is thereby interposed between the hubcap 42 and the spoked wire basket 32 to cover the center of the wire basket 32. The retention ring 36 includes four arcuate locator apertures 49, as depicted in FIGS. 1 and 9.

The hubcap 42 is also a stamped sheet metal structure, preferably with a chrome finish and is cup-shaped with a radially directed annular rim at its perimeter and with a raised, axially extending hexagonal pedestal 47 at its center. The widened base of the stud 44 is secured by welding or other means to the inwardly facing cup-like interior of the hubcap 42, so that a wrench may be employed to rotate the hexagonal pedestal of the hubcap 42 to engage and disengage the threaded stud 44 in mating, threadably interengaged fashion with the nipple 24.

With the component parts depicted in FIGS. 1-4, the wheel cover 10 is secured in combination to the automotive vehicle wheel 11 by the frictional interaction of the fingers 17 with the tire rim 13. The decorative spokes 40 of the wire basket 32 effectively visually simulate the appearance of a wheel with a tire frame having a central hub, a peripheral tire rim, and a multiplicity of spokes extending therebetween to support the tire rim on the hub. Because of the pleasing visual appearance, the wheel cover 10 is subject to a high rate of theft unless protected. While the local risk of theft may not warrant the expense of any locking mechanism in some geographic areas of use, in other areas a locking mechanism is the only effective means of preventing the wheel cover 10 from being stolen.

A locking mechanism may be sold with the wheel cover 10, or as a conversion kit which may be used to modify the wheel cover 10. When marketed as a conversion kit, the locking mechanism includes a hub spacer 70, depicted in FIG. 5, a locking replacement hubcap 42', depicted in FIG. 7, a locking bolt 102, a specially designed key 108, depicted in FIGS. 12 and 13 for securing and removing the locking bolt 102, and a cap 112 which is mounted upon the locking hubcap 42' for concealing the locking bolt from view, as depicted in FIGS. 7 and 11.

A wheel cover 10 modified with a locking mechanism is depicted in FIGS. 5-11. In such an arrangement, a hub spacer 70 is secured against the bolt-on flange 12 in the absence of the removable plate 22, and projects toward the central opening 18 of the hub cover 15, as illustrated in FIG. 7. A guide in the form of a slot 74 is defined in the hub spacer 70, as depicted in FIG. 8. A nut 76 serves as a fastener and is longitudinally constrained and laterally movable within the slot 74 to facilitate centering of the locking hubcap 42' and the retaining ring 36 on the wire basket 32.

The hub spacer 70 has a central bridge 72 oriented transverse to the axis of the wheel 11, illustrated in Fig. 8. The guiding slot 74 is defined in the bridge 72 and extends normal to the orientation of the bridge 72. The fastening nut 76 has longitudinal channels defined in its sides so that it cannot rotate in the slot 74, but can only slide reciprocally therealong and is restrained from rotation within the slot 74. A central tapped bore is defined through the nut 76. The bridge 72 also includes two spaced locator apertures 77, offset from the ends of the slot 74 on opposite sides thereof.

The hub spacer 70 includes a pair of spaced apart upstanding legs 78 extending inwardly from the ends of the bridge 72 and terminating in feet with outturned pads 81 extending laterally therefrom, as depicted in FIGS. 5 and 8. The pad 81 of each foot 80 includes an aperture 82 defined therein. As illustrated in FIG. 8, the apertures 82 are adapted to receive lug fasteners 84, either lug bolts extending into the brake drum behind the wheel 11 or studs extending outwardly therefrom. The lug bolts 84, depicted in FIG. 8, extend through the apertures 82 in the hub spacer feet 80 to secure the foot pads 81 of the hub spacer 70 against the bolt-on flange 12, and to secure the hub spacer 70 to the wheel 11.

The hub spacer 70 can be utilized with wheels 11 which employ either four or five lugs. The lug bolts 84 extend through the apertures 82 to bear against the outer surface of the pads 81 of the feet 80 to thereby entrap the feet 80 of the mounting brackets 70 against the raised boss 14 of the wheel 11. At the same time, the nut 76 is able to slide along the slot 74. Utilizing the flexibility of positioning provided by the slot 74 and the sliding nut 76, the hub spacer 70 may be positioned against the raised boss 14 of the bolt-on flange 12 by the lug bolts 84 while the nut 70 in the bridge 72 is positioned in coaxial alignment with wheel 11.

The structure of the adjustable legs 78 of the lug spacer 70 is illustrated in FIG. 10. The lug spacer legs 78 are formed of segments, including axially outwardly turned flanges 86 of the feet 80 and inwardly turned tangs 88 at each end of the bridge 72. The flanges 86 and the tangs 88 are positioned in mutual juxtaposition and are longitudinally offset from each other as depicted in FIG. 10. A series of spaced apertures 90 are defined at regular intervals in the flanges 86 at distances spaced above the surface of the pads 81 of the feet 80. Similarly, apertures 90 are formed in the tangs 88 at the same spaced intervals as the apertures in the flanges 86. The apertures 90 in the flanges 86 and tangs 88 are mutually alignable, and short stove bolt assemblies 92 serve as a means for securing the segments of the legs 78 in a plurality of longitudinally offset positions to thereby selectively adjust the lengths of the legs 78. The stove bolt assemblies 92 include a bolt having a shank which extends through the aligned apertures 90 in the juxtaposed leg segments formed by the flanges 86 and the tangs 88. Lock washers and nuts are attached to the bolt shanks to complete the bolt assemblies 92, as depicted in FIGS. 7, 8 and 10. The distance at which the bridge 72 is held from the wheel 11 may be increased by aligning apertures 90 at the extremities of the flanges 86 and the tangs 88, or decreased by moving the bridge 72 towards the footpads 81 to mutually align other of the apertures 90.

The locking replacement hubcap 42' is substituted for the hubcap 42 of FIG. 1, as illustrated in FIG. 7. The locking hubcap 42' has an outer geometric appearance quite similar to the hubcap 42. However, the locking hubcap 42' includes at the center thereof an exteriorly facing central axial recess 98, depicted in FIGS. 7 and 9. The recess 98 defines a narrow bearing shoulder 100 therein, within which there is a smaller diameter bore. A short sleeve 101 extends inwardly from the shoulder 100.

The locking bolt 102 has a head 104 with a contoured outer perimeter of unique configuration. The head 104 of the locking bolt 102 seats against the shoulder 100 in the recess 98. An externally threaded shank 106 extends from the head 104 of the locking bolt 102 in place of the stud 44 of the non-locking hubcap 42. The shank 106 is threadably engaged in the central tapped bore in the nut 76 of the hub spacer 70.

The locking bolt 102 is engaged and disengaged with the nut 76 by means of a specially configured key 108, depicted in FIGS. 12 and 13. The key 108 has a tubular body 110 which seats snugly in the recess 98 and in engagement with the contoured interface surface, which is the outer perimeter of the head 104 of the locking bolt 102 in the embodiment depicted. As illustrated in FIG. 13, the cross-section of the tubular body 110 corresponds to and fits over the contoured outer surface of the head 104 of the locking bolt 102. While conventional crescent wrenches and socket wrenches will not fit into the recess 98 over the head 104 of the locking bolt 102, the tubular body 110 of the key 108 depicted in FIGS. 12 and 13 can be inserted to engage the head 104 and advance or withdraw the locking bolt 102 therefrom. The key 108 is used to lock and unlock the replacement hubcap 42', the retention ring 36, the wire basket 32 and the hub cover 15 relative to the hub spacer 70.

A circular disc-like cap 112 is mounted upon the locking hubcap 42' to conceal the recess 98 and the locking bolt 102. Preferably, the cap 112 is a disc-like plastic structure with a decorative design thereon and fits flush with the exposed surface of the pedestal of the locking hubcap 42', as depicted in FIGS. 7 and 11. Upon first inspection, the means for removing the wheel cover 10 employing the locking hubcap 42' from the wheel 11 is not readily apparent. To effectuate removal, one must first be aware that the cap 112 conceals the locking bolt 102. Even so, the locking bolt 102 cannot be removed without the special key 108 depicted in FIGS. 12 and 13. The locking mechanism thus provided by the invention affords a deterrent to prevent the theft of a wheel cover 10.

The locking hubcap 42' is also provided with at least one locator pin 114 laterally offset from the axial center of the locking hubcap 42' and extending inwardly therefrom. The locator pin 114 extends through one of the arcuate locator apertures 49 in the retention ring 36 and through one of the locator apertures 77 in the hub spacer 70 to immobilize the hubcap 42', the retention ring 36, the wire basket 32 and the hub cover 15 against rotation relative to the bolt on flange 12.

To convert the wheel cover 10 from a configuration without a lock, as depicted in FIGS. 1–4 to a locking configuration depicted in FIGS. 5–11, the plate 22 is first removed from the opening 18 in the hub cover 15. This is achieved by unscrewing the hubcap 42 from the nipple 24 and removing the hubcap 42, the retaining ring 36, and the wire basket 32 from the hub cover 15. The hub cover 15 is also removed from the wheel 11. A sharp, light inwardly directed blow on the nipple 24 will dislodge the flanges 26 of the plate 22 from the notches 20 of the opening 18, and the plate 22 is thereby removed and discarded or stored.

The hub spacer 70 is then secured in place on the wheel 11. This is accomplished by loosening two opposing lug bolts 84, depicted in FIG. 8, and positioning the apertures 82 of the footpads 81 into registration with the corresponding tapped bolt wells in the brake drum behind the wheel 11. The lug bolts 84 are then threadably engaged into the tapped bolt wells through the apertures 82 and through the wheel 11 so that the footpads 81 bear against the bolt-on flange 12. Minor adjustments of positioning are achieved by moving the nut 76 along the slot 74 to align the central tapped bore in the nut 76 with the axial center of the wheel 11.

The hub cover 15 is then pressed into position so that the fingers 17 grip the tire rim 13 and the bead 45 of the hub cover 15 resides in the channel 46. If any adjustment is required to bring the bridge 72 of the hub spacer 70 closer to or further from the wheel 11, the hub cover 15 must be removed and the stove bolt assemblies 92 are also removed. The flanges 86 and tangs 88 are then readjusted in overlapping displacement as necessary, and the stove bolt assemblies 92 repositioned at corresponding apertures 90 in the flanges 86 and tangs 88 to bring the bridge 72 approximately even with the opening 18 in the hub cover 15.

The hub cover 15 is then repositioned on the wheel 11 so that the fingers 17 grip the tire rim 13. The spoked wire basket 32 is then seated in contact with the exterior surface 34 of the hub cover 15. The retaining ring 36 is positioned at the center of the wire basket 32 so that the fingers 62 bracket the ends 38 of the spokes 40. The locking replacement hubcap 42' is then substituted for the nonlocking hubcap 42. The locking hubcap 42' is positioned so that the locator pin 114 extends through one of the locator apertures 49 in the retaining ring 36 and through one of the locator apertures 77 in the bridge 72, as depicted in FIG. 7. The special key 108 is then used to advance the lock bolt 102 into the recess 98 in the locking hubcap 42' to thereby engage the shank 106 of the locking bolt 102 with the nut 76 of the hub spacer 70. Once the locking bolt 102 has been tightened, the key 108 is removed and the mask-like cap 112 is inserted in the recess in the pedestal of the locking hubcap 42'. The locking hubcap 42', the retention ring 36, the wire basket 32, the hub cover 15, and the hub spacer 70 are thereupon all rotatably immobilized relative to each other and relative to the vehicle wheel 11.

Undoubtedly, numerous variations of the invention will become readily apparent to those familiar with wheel cover devices. For example, the contoured interface of the locking bolt may be defined as an interior, configured cavity, rather than a contoured outer perimeter. The key required to fit into this cavity to operate the bolt must have a corresponding specially configured surface at its tip. Also, it is to be understood that a locking nut secured to a projecting stud is equivalent to a locking bolt and that the arrangement of projecting threaded shanks and tapped bores can be reversed throughout the structure of the invention while still falling within the scope of the invention. Accordingly, the scope of the invention should not be construed as limited to the specific embodiment depicted, but rather is defined in the claims appended hereto, and structure equivalent thereto.

We claim:

1. In the combination of an automotive vehicle wheel having a bolt-on flange and a tire rim, and a wheel cover that includes:

a hub cover in which a central axial opening is defined, and having an interior surface facing said bolt-on flange, an opposite exterior surface, and radially peripheral means for gripping said tire rim, a plate removably mounted in said central opening of said hub cover to bear against the interior surface thereof and having releasable fastening means thereon; a decorative basket seated upon said exterior surface of said hub cover, a retention ring located externally on said basket to cover the center of said basket and configured to seat thereon, and a non-locking hubcap for removable mounting externally of said retention ring at the center thereof and having fastening means releasably engageable with said fastening means of said plate for securing said hubcap and basket to said hub cover, a conversion kit for providing said wheel cover with a locking mechanism, comprising:

a hub spacer defining a guide and secureable against said bolt-on flange interiorly of said hub cover in the absence of said plate to project axially toward said central opening of said hub cover;

a fastener longitudinally constrained and laterally movable within said guide;

a replacement hubcap for mounting in place of said non-locking hubcap and defining an exteriorly facing central axial recess forming a narrow bearing shoulder and a smaller diameter axial bore;

lockable fastening means seated in said recess against said shoulder and engageable with said fastener in said guide and having a contoured interface surface;

a removable locking key having a tubular body which seats snugly in said recess in engagement with said contoured interface surface of said lockable fastening means for engaging and disengaging said lockable fastening means to and from said fastener in said guide to lock and unlock said replacement hubcap, said retention ring, said basket and said hub cover relative to said hub spacer; and a cap mountable upon said replacement hubcap to conceal said recess.

2. The conversion kit of claim 1, wherein the hub spacer includes a pair of spaced apart legs, the free ends of which project toward said central opening, and a pad is longitudinally adjustably secured to the free ends of said legs to attach said legs to the wheel.

3. The conversion kit of claim 2, wherein said pads are formed with apertures that receive lug bolts to secure said spacer to the wheel, with said apertures being elongated laterally to permit lateral adjustment of said hub spacer relative to the wheel.

4. The conversion kit of claim 2, wherein said hub spacer guide includes a bridge which is formed with an elongated slot that receives said fastener to permit lateral movement of said fastener therein.

5. The conversion kit of claim 3, wherein said hub spacer guide includes a bridge which is formed with an elongated slot that receives said fastener to permit lateral movement of said fastener therein.

6. The conversion kit of claim 4, wherein said bridge is formed with located apertures that receive a locator pin which extends inwardly from said hubcap and said retention ring to immobilize said hubcap, retention ring, and basket against rotation relative to the wheel.

* * * * *

Disclaimer

4,447,091.—*Liem Nguyen*, Garden Grove; *William J. Segal*, Van Nuys; *Kent Friend*, Santa Ana, all of Calif. CONVERTIBLE WIRE WHEEL HUB COVER. Patent dated May 8, 1984. Disclaimer filed Mar. 29, 1989, by the assignee Mr. Gasket Company.

Hereby enters this disclaimer to the entire term of said patent.
[ *Official Gazette January 30, 1990* ]